United States Patent
Tso et al.

(10) Patent No.: US 10,437,054 B2
(45) Date of Patent: Oct. 8, 2019

(54) HEAD-UP DISPLAY SYSTEM

(71) Applicant: FUYAO GLASS INDUSTRY GROUP CO., LTD., Fuzhou (CN)

(72) Inventors: Fai Tso, Fuzhou (CN); Junlin Yuan, Fuzhou (CN); Dong Zeng, Fuzhou (CN); Penghui Zhang, Fuzhou (CN); Zhu Lin, Fuzhou (CN); Guoshui Lu, Fuzhou (CN); Yinghao Peng, Fuzhou (CN); Kohta Fukuhara, Fuzhou (CN)

(73) Assignee: Fuyao Glass Industry Group Co., Ltd., Fuzhou, Fijian (CN)

( * ) Notice: Subject to any disclaimer, the term of this patent is extended or adjusted under 35 U.S.C. 154(b) by 0 days.

(21) Appl. No.: 15/514,723

(22) PCT Filed: Sep. 24, 2015

(86) PCT No.: PCT/CN2015/090520
§ 371 (c)(1),
(2) Date: Mar. 27, 2017

(87) PCT Pub. No.: WO2016/058474
PCT Pub. Date: Apr. 21, 2016

(65) Prior Publication Data
US 2017/0242247 A1    Aug. 24, 2017

(30) Foreign Application Priority Data
Oct. 14, 2014  (CN) .......................... 2014 1 0540150

(51) Int. Cl.
*G02B 27/14* (2006.01)
*G02B 27/01* (2006.01)
*G02B 5/00* (2006.01)
*B32B 17/10* (2006.01)
(Continued)

(52) U.S. Cl.
CPC .... *G02B 27/0101* (2013.01); *B32B 17/10036* (2013.01); *B32B 17/10229* (2013.01);
(Continued)

(58) Field of Classification Search
CPC ........ B32B 17/10036; B32B 17/10165; G02B 5/30; G02B 5/305; G02B 5/3066; G02B 27/0101; G02B 2027/0194
(Continued)

(56) References Cited

U.S. PATENT DOCUMENTS 5,510,913 A * 4/1996 Hashimoto ........ C09K 19/3809
349/11
5,999,314 A 12/1999 Asakura et al.
(Continued)

FOREIGN PATENT DOCUMENTS

| CN | 1732404 A | 2/2006 |
| CN | 1969219 A | 5/2007 |

(Continued)

OTHER PUBLICATIONS

Extended European search report issued in corresponding European application No. 15850385.4 dated Mar. 22, 2018.

*Primary Examiner* — Mahidere S Sahle
(74) *Attorney, Agent, or Firm* — Fish IP Law, LLP

(57) ABSTRACT

The present invention relates to the technical field of head-up display, and particularly relates to a head-up display system for an automobile. The head-up display system comprises a projection light source and laminated glass, and further comprises a transparent nanofilm; said film comprises at least two dielectric layers and at least one metallic layer; the projection light source is used for generating p-polarized light; the p-polarized light is incident on a surface of an internal glass panel distal to an intermediate film, said light having an angle of incidence of 42 to 72 degrees, such that the transparent nanofilm can reflect part of the incident p-polarized light.

8 Claims, 5 Drawing Sheets

(51) Int. Cl.
  *B60J 1/02* (2006.01)
  *B60K 35/00* (2006.01)
  *C03C 17/36* (2006.01)
  *G02B 27/00* (2006.01)

(52) U.S. Cl.
  CPC .......... *B32B 17/10761* (2013.01); *B60J 1/02* (2013.01); *B60K 35/00* (2013.01); *C03C 17/366* (2013.01); *C03C 17/3618* (2013.01); *C03C 17/3626* (2013.01); *C03C 17/3644* (2013.01); *G02B 5/00* (2013.01); *G02B 27/0018* (2013.01); *G02B 27/01* (2013.01); *B32B 2457/20* (2013.01); *B32B 2605/08* (2013.01); *B60K 2370/334* (2019.05); *B60K 2370/39* (2019.05); *B60K 2370/77* (2019.05); *C03C 2217/281* (2013.01); *C03C 2218/156* (2013.01); *G02B 2027/012* (2013.01); *G02B 2027/0112* (2013.01); *G02B 2027/0194* (2013.01)

(58) Field of Classification Search
  USPC .................... 359/13, 630, 632; 345/7–9
  See application file for complete search history.

(56) References Cited

U.S. PATENT DOCUMENTS

| | | | |
|---|---|---|---|
| 6,259,559 | B1 | 7/2001 | Kobayashi et al. |
| 2004/0135742 | A1 | 7/2004 | Weber et al. |
| 2009/0153962 | A1 | 6/2009 | Okada et al. |
| 2009/0316262 | A1* | 12/2009 | Kittaka ................ G02B 5/3041 |
| | | | 359/485.01 |
| 2012/0317903 | A1 | 12/2012 | Kuwano |
| 2014/0340759 | A1* | 11/2014 | Yano .................... G02B 27/142 |
| | | | 359/630 |

FOREIGN PATENT DOCUMENTS

| | | |
|---|---|---|
| CN | 101446653 A | 6/2009 |
| CN | 104267498 A | 1/2015 |
| CN | 204143067 U | 2/2015 |
| CN | 204166197 U | 2/2015 |
| EP | 0836108 A2 | 4/1998 |
| JP | 07134265 A | 5/1995 |
| WO | 2005017600 A1 | 2/2005 |

* cited by examiner

HEAD-UP DISPLAY SYSTEM

CROSS-REFERENCE TO RELATED APPLICATIONS

This application claims priority to Chinese Patent Application No. 201410540150.1, filed with the Chinese Patent Office on Oct. 14, 2014 and entitled "HEAD-UP DISPLAY SYSTEM", which is hereby incorporated by reference in its entirety.

TECHNICAL FIELD

The present disclosure relates to the technical field of head-up display, and particularly relates to a head-up display system for an automobile.

BACKGROUND

With development of science and technology, head-up display (HUD) systems are used more and more widely in automobiles. A head-up display system in an automobile can display important driving information in real time, such as speed, engine revolution, fuel consumption, tire pressure, navigation and information from external smart devices, in view field of a driver on a front windshield. In this way, the driver can see the driving information without looking down, thus avoiding distracting attention to roads in the front; meanwhile, the driver do not have to adjust eyes when viewing faraway roads and nearby meters, thus avoiding eyestrain, greatly enhancing driving security and improving driving experience.

Currently, the head-up display technology is achieved mainly in two modes: luminescence imaging mode and projection imaging mode. The projection imaging mode uses the front windshield itself of the automobile or an extra disposed optical element to perform projection display, while adopting the front windshield to reflect a projected image is a mode having the simplest structure. An ordinary front windshield is generally laminated glass, which is formed by sandwiching a thermoplastic polymer film (such as polyvinyl butyral, i.e. PVB) between at least two glass substrates having a certain curvature. Light emitted by a projection light source of the head-up system may be reflected when it travels through two air-contacting surfaces of the laminated glass, and reflected images on the two surfaces may be shifted from each other to form double images (so called ghost) interfering mutually which are even more obvious especially if the laminated glass has a great thickness (generally, greater than 3 mm), thereby greatly limiting the definition of the projected images.

To solve the problem of double images of the head-up system on the front windshield of the automobile, several solutions have been proposed in prior art. For example, one of the solutions disclosed in CN101038349A, US2002172804A1 and US2007148472A1 is that a wedge-shaped polymer film is used as an intermediate film of the laminated glass, such that the laminated glass has a wedge-shaped cross-section decreasing from top to bottom, thus enabling the reflected images, seen by the driver, on the two surfaces to substantially overlap, and as a result greatly solving the problem of double images. Similar to the above, only a part of a glass substrate may have a wedge-shaped cross-section, as disclosed in U.S. Pat. No. 6,414,796B1. However, these technical solutions have following disadvantages: (1) the problem of double images may not be solved thoroughly, such that these solutions are not suitable for high-definition image display; (2) a PVB film of special specification should be adopted, and the price thereof is 7-10 times higher than that of an ordinary PVB film, the manufacturing process thereof has a high difficulty, such that the cost of the material and the manufacturing process is extremely high; (3) these solutions are easily affected by optical designs for automobile models, and generally the front windshield of a specific automobile mode should be redesigned.

Another solution is that an optical functional layer capable of changing the direction of polarized light or a reflective polarizer capable of reflecting p-polarized light or s-polarized light may be disposed on the surface of the laminated glass or in the laminated glass, and the p-polarized light or the s-polarized light emitted by the projection light source of the head-up display system is incident at a given angle (e.g. Brewster's angle), such that the reflected image on a certain surface may be eliminated as much as possible by means of the reflection property of the laminated glass for different polarized light, and as a result, double images are prevented. Such a technical solution is disclosed in patents such as EP0836108A2, EP0844507A1, U.S. Pat. No. 6,327,089B1, CN1969219A, U.S. Pat. No. 7,355,796B2, CN101151568A, U.S. Pat. No. 7,839,574B2, CN1732404A, CN102256910A, etc. However, the technical solution may be achieved only when the extra optical functional layer or the reflective polarizer is additionally disposed on/in a part of the laminated glass (i.e. head-up display projection area), thereby inevitably increasing the material cost and the manufacturing process difficulty. For example, the p-polarization reflective polarizer disclosed in CN1732404(A) has up to tens or hundreds of polymer layers; meanwhile, the uniformity and appearance of the entire front windshield may be destroyed; besides, the bonding strength on the part of the laminated glass where the optical functional layer or the reflective polarizer is disposed may be reduced to cause potential safety hazard; moreover, a part of the optical functional layers or the reflective polarizers have a relatively low transmissivity for visible light, which may affect the view field of the driver or the appearance of the front windshield.

Furthermore, in the prior art, the luminance of a reflected image formed on one of interfaces may be reduced by additionally disposing an anti-reflective (AR) coating on the surface of the laminated glass. For example, the technical solution disclosed in U.S. Pat. No. 7,864,431B2 is that the anti-reflective coating is disposed on an air-contacting surface of a laminated glass or a low-emissivity (low-E) coating is additionally disposed on the surface on which the anti-reflective coating is not disposed. However, this technical solution has following disadvantages: (1) the anti-reflective coating may not withstand harsh usage environment, such as acid rain, dust, wiper friction, alkaline cleaner, etc., when it is deposited on the air-contacting surface of the laminated glass, especially on the exterior surface of the laminated glass; (2) the anti-reflective coating has a relatively complicated structure, especially the anti-reflective coating which has fine broadband anti-reflection, a reflectivity of approximately zero, and a fine appearance both at a small angle and a large angle requires multilayer deposition, such that its total thickness is up to hundreds of nanometers, and therefore it is unsuitable for being deposited on the front windshield of the automobile over a large area; (3) the anti-reflective coating may not solve the problem of double images thoroughly, especially light purple or light blue reflected light may be still visible from a large angle; (4) the anti-reflective coating deposited on the exterior surface of the laminated glass may be covered by a water layer in rainy days, and at this time, the anti-reflective effect may be greatly reduced, thereby causing serious double images; (5) since the anti-reflective coating is disposed on the air-contacting surface of the laminated glass, the reflected image formed on the additional low-emissivity coating may not be eliminated, double images may still exist to some extent.

Likewise, the visible double images may also reduced by the means of enhancing the reflected light formed on the air-contacting surface of the laminated glass. For example, in a filming HUD projector common in parts markets, a semitransparent reflecting film adheres to the HUD projection area in advance; or as disclosed in U.S. Pat. No. 6,137,630A, a plurality of dielectric layers having a high refractive index and a plurality of dielectric layers having a low refractive index are deposited alternately on an air-contacting surface of a laminated glass, thus enhancing the intensity of the reflected light on the air-contacting surface, while the intensity of the reflected light on the other surface is barely changed, and therefore the visible reflected image is mainly formed by the reflected light on the surface of the film. Apparently, in this technical solution, on one hand, the uniformity and appearance of the entire front windshield of the automobile is destroyed, and on the other hand, the problem of double images may not be solved thoroughly.

In the head-up display system of the automobile, in addition to solving the problem of double images, the display system is required to be capable of displaying colors as much as possible, so as to be capable of displaying various different information images. For example, as disclosed in Chinese Patent CN2694293Y, the head-up displayer is enabled to have narrow wavelength reflection bands of the three primary colors, red, green and blue, by depositing a plurality of films having different refractive indexes on a substrate; or as disclosed in U.S. Pat. No. 6,137,630A, the plurality of dielectric layers having a high refractive index and the plurality of dielectric layers having a low refractive index are deposited alternately on the air-contacting surface of the laminated glass to achieve full-color display. Actually, if the full-color display requirement may not be met, the green light reflection to which human eyes are most sensitive should be ensured as much as possible.

SUMMARY

The present disclosure is addressed to the aforementioned deficiencies in the prior art, and provides a head-up display system which is clear without a ghost image, capable of achieving multi-color display, and has a simple structure, simple processes and a low cost.

A technical solution adopted by the present disclosure to overcome the deficiencies is a head-up display system, comprising a projection light source and laminated glass, the laminated glass comprising an internal glass panel, an external glass panel and an intermediate film sandwiched between the internal glass panel and the external glass panel, wherein the head-up display system further comprises a transparent nanofilm comprising at least two dielectric layers and at least one metallic layer, each metallic layer being located between two dielectric layers; a difference between a refractive index of the intermediate film and a refractive index of the internal glass panel and the external glass panel is no more than 0.1; and the projection light source is used for generating p-polarized light which is incident on a surface of the internal glass panel distal to the intermediate film, the light having an angle of incidence of 42 to 72 degrees, such that the transparent nanofilm can reflect part of the incident p-polarized light.

Furthermore, the metallic layer is a silver layer or a silver-containing alloy layer.

Furthermore, the p-polarized light has an angle of incidence of 55 to 70 degrees.

Furthermore, the difference between the refractive index of the intermediate film and the refractive index of the internal glass panel and the external glass panel is no more than 0.05.

Furthermore, the transparent nanofilm is disposed on a surface of the internal glass panel contacting the intermediate film or on a surface of the external glass panel contacting the intermediate film.

Furthermore, the transparent nanofilm is disposed on a polymer film, a difference between a refractive index of the polymer film and the refractive index of the internal glass panel and the external glass panel being no more than 0.1; and the polymer film provided with the transparent nanofilm is located between the internal glass panel and the external glass panel or is disposed on the surface of the internal glass panel distal to the intermediate film.

Furthermore, the color of the p-polarized light generated by the projection light source is at least one color selected from a group consisting of red, green and blue.

Preferably, when the transparent nanofilm comprises two metallic layers, the color of the p-polarized light generated by the projection light source is at least one color selected from a group consisting of green and blue.

Furthermore, when the transparent nanofilm in the head-up display system comprises two metallic layers or three metallic layers, an auxiliary film is additionally disposed, and comprises at least one auxiliary polymer film and an auxiliary transparent nanofilm disposed on the auxiliary polymer film and comprising a metallic layer; the auxiliary film is located at an area where the p-polarized light is incident, a distance between the auxiliary transparent nanofilm in the auxiliary film and the transparent nanofilm comprising two metallic layers or three metallic layers is no more than 350 μm.

Preferably, the distance between the auxiliary transparent nanofilm in the auxiliary film and the transparent nanofilm comprising two metallic layers or three metallic layers is no more than 100 μm.

Since the interface between the glass and the air has a relatively low reflectivity for the incident p-polarized light, and the transparent nanofilm can reflect part of the p-polarized light, the head-up display system according to the present disclosure can thoroughly prevent visible double images, markedly improve display quality, and is suitable for high-definition image display. Meanwhile, the structure and processes is quite simple, i.e. it is unnecessary to additionally dispose a particular optical element. Head-up display functionality of high quality can be achieved merely by installing a projection light source capable of generating p-polarized light on a vehicle having a front windshield provided with a transparent nanofilm; thus the cost involved is extremely low. By combining various transparent nanofilm structures, monochrome display, multi-color display, and even full-color display may be achieved.

DETAILED DESCRIPTION OF ILLUSTRATED EMBODIMENTS

A further description for the present disclosure will be provided hereinafter in conjunction with the accompanying drawings.

Figure 1:
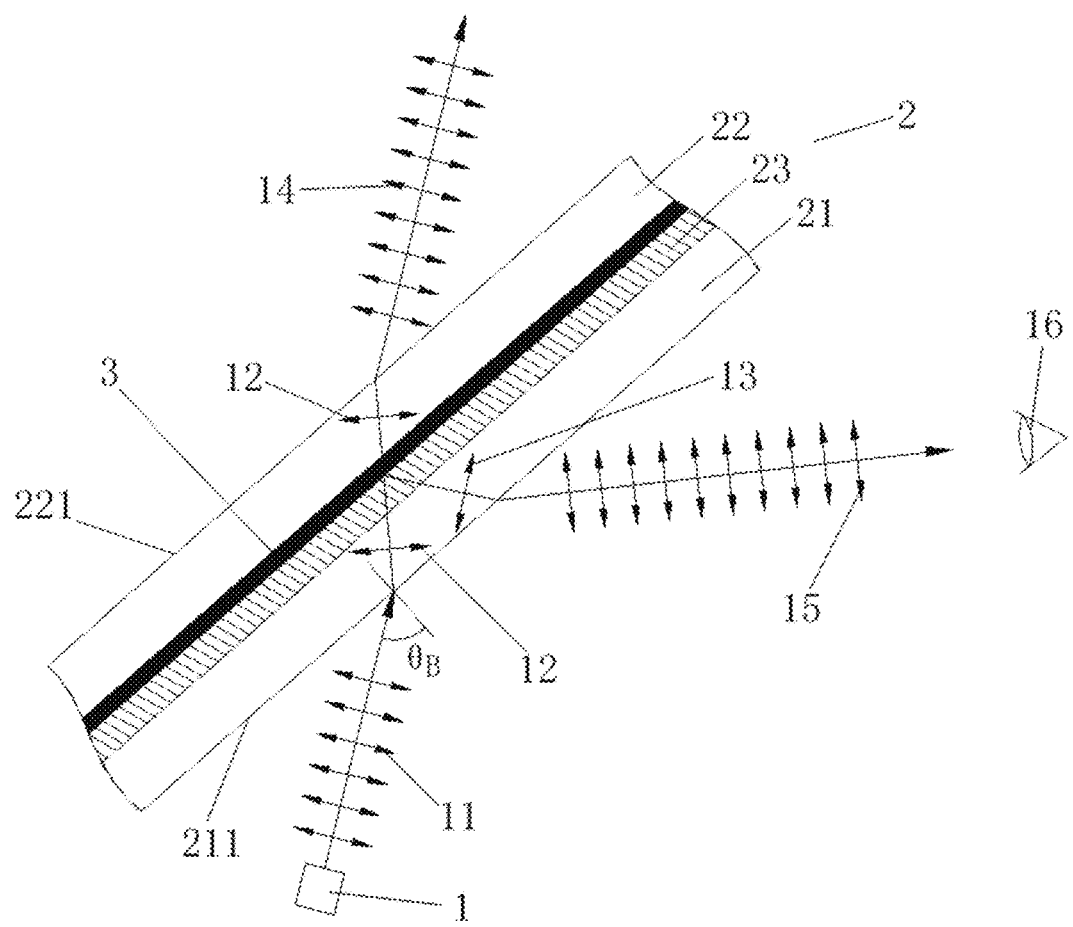
FIG. 1 is a partial sectional view of a head-up display system according to the present disclosure.

As shown in FIG. 1, a head-up display system according to the present disclosure comprises a projection light source 1 and laminated glass 2. The laminated glass 2 comprises an internal glass panel 21, an external glass panel 22 and an intermediate film 23 sandwiched between the internal glass panel 21 and the external glass panel 22. In order to prevent double images, the head-up display system further comprises a transparent nanofilm 3. The transparent nanofilm 3 comprises at least two dielectric layers and at least one metallic layer. Each metallic layer is located between the two dielectric layers. The projection light source 1 is used for generating p-polarized light 11. The p-polarized light 11 is incident on a surface 211, i.e. a first surface 211, of the internal glass panel 21 distal to the intermediate film 23. The light has an angle of incidence of 42 to 72 degrees, such that the transparent nanofilm 3 can reflect part of the incident p-polarized light 11. Moreover, in order to prevent the exterior of the laminated glass 2 from affecting the incident p-polarized light 11, preferably the difference between the refractive index of the intermediate film 23 and the refractive index of the internal glass panel 21 and the external glass panel 22 is not more than 0.1. Since the interface between the glass and the air has a relatively low reflectivity for the incident p-polarized light, and especially, the p-polarized light is not reflected when it is incident at a Brewster's angle $\theta_B$ (57 degrees), and the transparent nanofilm 3 can reflect part of the p-polarized light 11, the present disclosure can thoroughly prevent visible double images.

As shown in FIG. 1, the p-polarized light 11 generated by the projection light source 1 is incident on the surface 211 of the internal glass panel 21 distal to the intermediate film 23 at the Brewster's angle $\theta_B$ (57 degrees). Depending on the properties of the p-polarized light, the p-polarized light 11 is not reflected on the first surface 211, and only generates a first refracted light 12 entering the laminated glass 2. Since the difference between the refractive index of the intermediate film 23 and the refractive index of the internal glass panel 21 and the external glass panel 22 in the laminated glass 2 is not more than 0.1, i.e. their refractive indexes are almost the same, the first refracted light 12 is not reflected on a surface of the intermediate film 23 contacting the internal glass panel 21 or the external glass panel 22 and has a barely changed travelling direction until it reaches the transparent nanofilm 3. The metallic layer in the transparent nanofilm 3 can reflect part of the first refracted light 12 which forms a first reflected light 13, and the other part of the first refracted light 12 passes through the transparent nanofilm 3 to continue travelling and reach a surface 221, i.e. a second surface 221, of the external glass panel 22 distal to the intermediate film 23. Since the transparent nanofilm 3 has a extremely thin thickness, the part of the first refracted light 12 passing through the transparent nanofilm 3 also has a barely changed travelling direction. According to the reversibility of optical path, the part of the first refracted light 12 which reaches the surface 221 of the external glass panel 22 distal to the intermediate film 23 is not reflected on the second surface 221, and only generates a second refracted light 14 entering the air. The first reflected light 13 travels and reaches the first surface 211. According to the reversibility of optical path, the first reflected light 13 is not reflected on the first surface 211, either, and only generates a third refracted light 15 visible to an observer 16. As seen from the above travelling paths of the p-polarized light 11, the displayed images visible to the observer 16 is merely formed by the third refracted light 15. In this way, the present disclosure thoroughly prevents double images, markedly improves display quality, and is suitable for high-definition image display.

The projection light source 1, as a device for displaying information, such as characters, images, etc., is connected to relevant instruments, external sensors, external smart devices, etc. of the automobile, and projects relevant character, image information such as speed, engine revolution, fuel consumption, tire pressure, navigation, night vision etc. on the laminated glass 2 with the p-polarized light 11, such that the information is visible to the observer 16 inside the automobile. The projection light source 1 is an element known by persons skilled in the art, including but not limited to a laser, a light emitting diode (LED), a liquid crystal display (LCD), an electroluminescent (EL) element, a cathode-ray tube (CRT), a vacuum fluorescent tube (VFD), a collimating mirror, a spherical mirror, a convex lens, a concave lens, a reflector, and/or a polarizer, etc. Meanwhile, the location and incident angle of the projection light source 1 is adjustable, so as to be adapted to the observer 16 in different locations or heights inside the automobile.

The laminated glass 2 comprises the internal glass panel 21, the external glass panel 22 and the intermediate film 23 sandwiched between the internal glass panel 21 and the external glass panel 22. The internal glass panel 21 is oriented toward the internal of the automobile, while the external glass panel 22 is oriented toward the external of the automobile. The intermediate film 23 is a thermoplastic polymer film, in order to reduce the impact of the intermediate film 23 on the first refracted light 12, the refractive index of the intermediate film 23 is selected to be almost the same as that of glass, i.e. the difference between the refractive index of the intermediate film 23 and the refractive index of the internal glass panel 21 and the external glass panel 22 is no more than 0.1, further preferably, the difference between the refractive index of the intermediate film 23 and the refractive index of the internal glass panel 21 and the external glass panel 22 is no more than 0.05, for example, a common-used PVB film may be selected as the intermediate film. The laminated glass 2 as shown in FIG. 1 is flat for the convenience of drawing, while actually the laminated glass 2 may be curved. It may be understood that the laminated glass 2 which is curved is a preferable solution according to the present disclosure, but the laminated glass 2 is not limited to it, and other transparent components, such as single-layered or multilayered, flat or curved (with uniform or variant curvature), colorless or colored transparent components formed from normal glass and/or plastic may replace the laminated glass 2.

Figure 8A:
FIG. 8A and FIG. 8B are head-up display images of p-polarized light having angles of incidence of 57 degrees, 66 degrees according to the present disclosure.
Figure 8B:
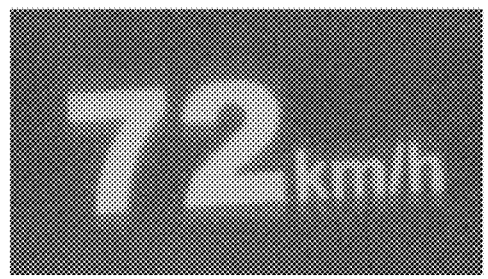
Figure 8C:
FIG. 8C is an image displayed by the head-up display system having an ordinary laminated glass.

The p-polarized light 11 of the present disclosure is incident from the air to the surface 211 of the internal glass panel 21 distal to the intermediate film 23 at an angle of 57 degrees (i.e. Brewster's angle $\theta_B$), such that the reflection on the first surface 211 may be prevented. The Brewster's angle $\theta_B$ herein is relevant to refractive index of a specific optical material. As for a common material used for the front windshield of the automobile, the Brewster's angle $\theta_B$ is approximately 57 degrees. More strictly, the Brewster's angle $\theta_B$ is also relevant to the wavelength of the p-polarized light, while its impact is quite small in the present disclosure. Generally, the Brewster's angle $\theta_B$ may be regarded as a constant in the range of visible light wavelength (380-780 nm). As shown in FIG. 8A, the incident angle of the p-polarized light is the Brewster's angle of 57 degrees, and the HUD image (speed information) is clear without a ghost image in the head-up display system according to the present disclosure. Meanwhile, in actual process of the projection imaging, due to factors such as the relationship between the light source and the size of the projected virtual images, the installation structure of the front windshield, and the location of the light source, etc., the incident angle of the p-polarized light may be deviated from the Brewster's angle $\theta_B$, but the angle is deviated by no more than 15 degrees, i.e. the incident angle is 42 to 72 degrees, preferably 55 to 70 degrees, further preferably 55 to 64 degrees, and more preferably 56 to 59 degrees. In this case, the reflected light from the first surface 211 and the second surface 221 may not be thoroughly eliminated, but its intensity is still quite low in contrast with the reflected light generated on the transparent nanofilm 3. As shown in FIG. 8B, the incident angle of the p-polarized light is deviated from the Brewster's angle by 9 degrees, i.e. the incident angle is 66 degrees. At this time, a ghost reflected image has a sufficiently weak luminance in contrast with a main reflected image, and appears as a relatively weak halo around the main reflected image, such that human eyes may not notice the existence of the ghost reflected image, and thus the ghost image is still invisible. In contrast with FIG. 8A and FIG. 8B, FIG. 8C shows a HUD image formed on an ordinary laminated glass, and the ghost image reflectivity is about 60% of the main reflected image reflectivity, such that the ghost image is apparently visible and the actual use effect of the laminated glass is obviously inferior to that as shown in FIG. 8A and FIG. 8B of the present disclosure.

The transparent nanofilm 3 can reflect part of the incident p-polarized light 11. The material of the metallic layer in the transparent nanofilm 3 may be any material which can reflect the p-polarized light 11, such as (but not limited to) silver (Ag), gold (Au), copper (Cu), aluminum (Al), etc. The silver or a silver-containing alloy is preferable in the present disclosure, and the silver-containing alloy is preferably an alloy containing silver with at least one of gold, aluminum, copper. The silver is used in the embodiments of present disclosure, and the protection scope of the present disclosure is not be limited by the thickness of the silver in the embodiments.

Figure 2A:
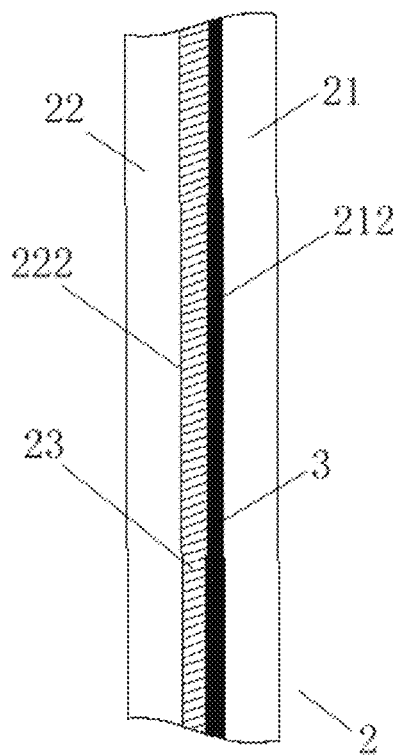
FIG. 2A and FIG. 2B are partial sectional views of a transparent nanofilm in the head-up display system located on a third surface or a forth surface.
Figure 2B:
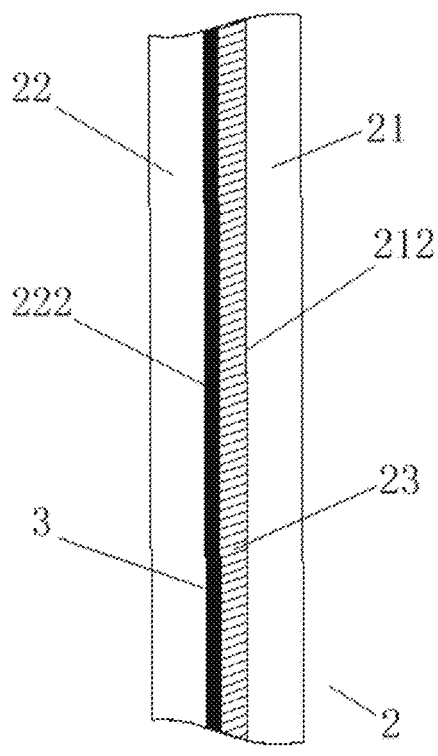

In order to ensure the usage environment for the transparent nanofilm 3 and protect the transparent nanofilm 3 from acid rain, dust, wiper friction, alkaline cleaner, etc., as shown in FIG. 2A, preferably the transparent nanofilm 3 is disposed on a surface 212, i.e. a third surface 212, of the internal glass panel 21 contacting the intermediate film 23; or as shown in FIG. 2B, preferably the transparent nanofilm 3 is disposed on a surface 222, i.e. a forth surface 222, of the external glass panel 21 contacting with the intermediate film 23. The process for providing the transparent nanofilm 3 may be a magnetron sputtering process well known in the art, i.e. the layers contained in the transparent nanofilm 3 is directly deposited on the third surface 212 of the internal glass panel 21 or the forth surface 222 of the external glass panel 22 by sputtering.

Figure 3A:
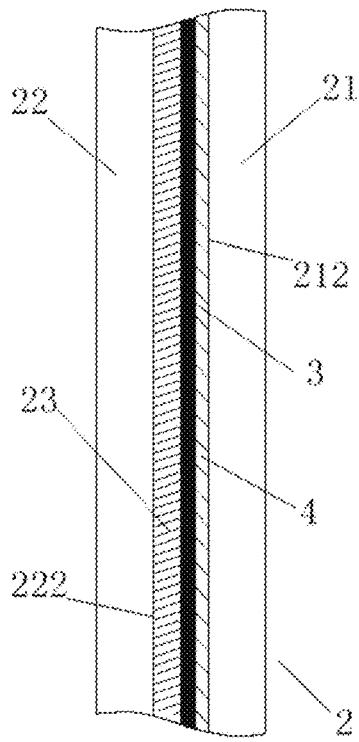
FIG. 3A, FIG. 3B, FIG. 3C and FIG. 3D are partial sectional views showing a polymer film provided with the transparent nanofilm in the head-up display system is located in different positions on a laminated glass.
Figure 3B:
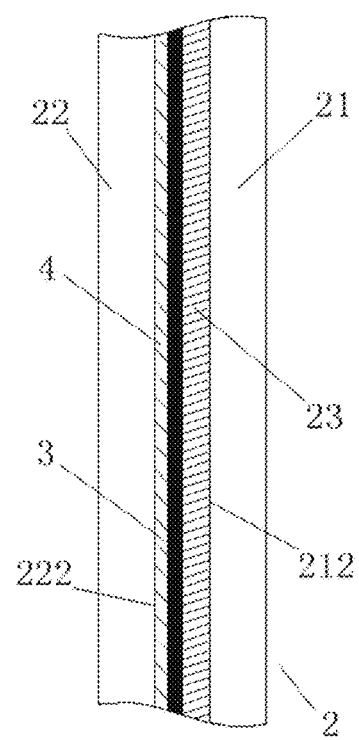
Figure 3C:
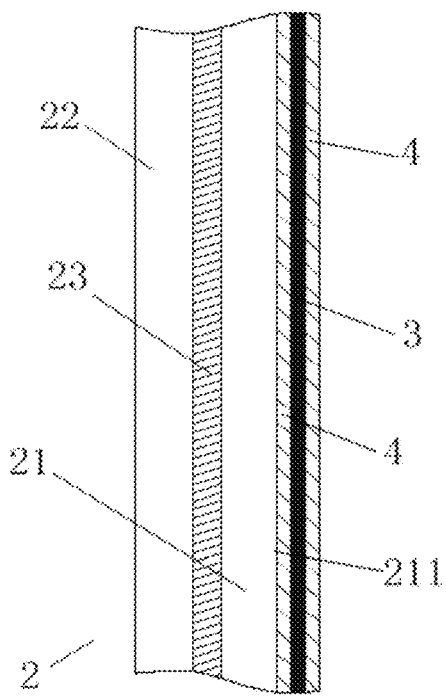
Figure 3D:
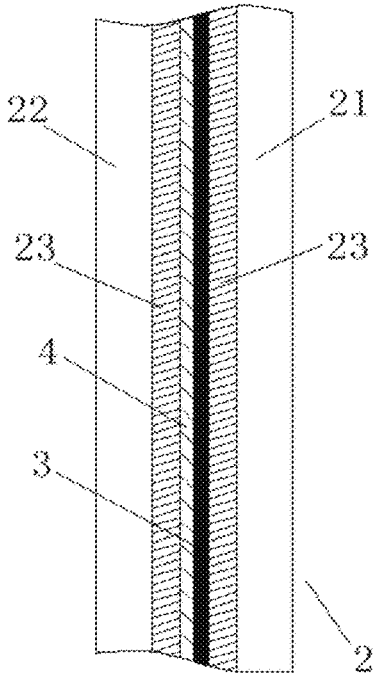

Likewise, in order to ensure the usage environment for the transparent nanofilm 3 and protect the transparent nanofilm 3 from acid rain, dust, wiper friction, alkaline cleaner, etc., as shown in FIGS. 3A, 3B, 3C and 3D, the transparent nanofilm 3 may also be disposed on a polymer film 4 which is used for supporting and protecting the transparent nanofilm 3. In order to reduce the impact of the polymer film 4 on the first reflected light 12, preferably the difference between the refractive index of the polymer film and the refractive index of the internal glass panel 21 and the external glass panel 22 is no more than 0.1, such as a common-used PET film. As shown in FIG. 3A, the polymer film 4 provided with the transparent nanofilm 3 is located between the internal glass panel 21 and the intermediate film 23, and the transparent nanofilm 3 is adjacent to the intermediate film 23, the polymer film 4 is adjacent to the internal glass panel 21; or as shown in FIG. 3B, the polymer film 4 provided with the transparent nanofilm 3 is located between the external glass panel 22 and the intermediate film 23, and the transparent nanofilm 3 is adjacent to the intermediate film 23, the polymer film 4 is adjacent to the external glass panel 22; or as shown in FIG. 3C, the polymer film 4 provided with the transparent nanofilm 3 is located on the surface 211, i.e. the first surface 211, of the internal glass panel 21 distal to the intermediate film 23, and an identical polymer film 4 is additionally disposed between the transparent nanofilm 3 and the first surface 211, so as to improve the adhesive strength between the transparent nanofilm 3 and the first surface 211; or as shown in FIG. 3D, the polymer film 4 provided with the transparent nanofilm 3 is located between two intermediate films 23. It is understood that, in the embodiments as shown in FIGS. 3A, 3B and 3D, at least one transparent polymer film as a protective layer for the transparent nanofilm 3 may be additionally disposed between the transparent nanofilm 3 and the intermediate film 23; in the embodiment as shown in FIG. 3A, at least one transparent polymer adhesive layer may be additionally disposed between the polymer film 4 and the internal glass panel 21; in the embodiment as shown in FIG. 3B, at least one transparent polymer adhesive layer may be additionally disposed between the polymer film 4 and the external glass panel 22.

The transparent nanofilm 3 of the present disclosure may comprise at least two dielectric layers and at least one metallic layer each located between the two dielectric layers, and may even comprise a barrier layer and/or a protective layer, etc. The specific structure of the above film does not affect the protection scope of the present disclosure, and therefore is not described in detail herein. According to the requirement of actual application, the quantity of the metallic layers in the transparent nanofilm may be variant, especially at least one common-used silver layer or silver-containing alloy layer, when as the metallic layer, may comprise one silver layer, two silver layers, three silver layers, or even more. The dielectric layers are made from $ZnSnMgO_x$, $ZnSnO_x$, ZnO, $SnO_2$, $TiO_2$, $Si_3N_4$, AlN, or the like. The transparent nanofilm in the present disclosure may have an optimized material and thickness, so as to withstand subsequent high-temperature heat treatment or other manufacturing process, such that the completed head-up display system can have an optical performance meeting the standard of automobile glass, and thus, disadvantages of pure metallic layer, such as poor durability, bad optical appearance or the like may be thoroughly overcome. The head-up display system according to the present disclosure, which comprises the transparent nanofilm 3 comprising one silver layer, has a transmissivity for visible light (TL) no less than 70% and a direct transmissivity for solar energy (TE) no more than 50%. The head-up display system, which comprises the transparent nanofilm 3 comprising two silver layers, has a transmissivity for visible light (TL) no less than 75% and a direct transmissivity for solar energy (TE) no more than 47%. The head-up display system, which comprises the transparent nanofilm 3 comprising three silver layers, has a transmissivity for visible light (TL) no less than 70%, a direct transmissivity for solar energy (TE) no more than 34%, and a total transmissivity for solar energy (Tts) not more than 40%. Moreover, the appearance color may be adjusted to a delightful neutral color, light blue, light blue-green or light purple as required.

Figure 4:
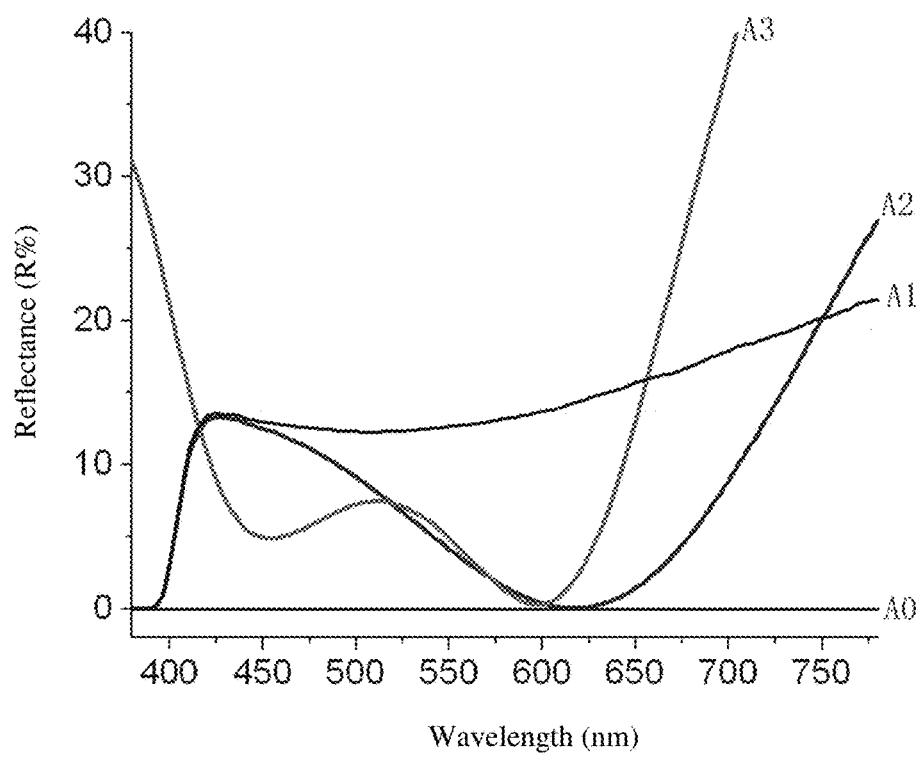
FIG. 4 is a graph showing a reflectivity spectrum of different head-up display systems for p-polarized light incident thereon, respectively, according to the present disclosure.

As shown in FIG. 4, Curve A0 shows a reflectivity spectrum of an ordinary laminated glass for the p-polarized light incident at an angle of 57 degrees (Brewster's angle $\theta_B$), Curve A1 shows a reflectivity spectrum, of a head-up display system comprising a transparent nanofilm comprising one silver layer, for the p-polarized light incident at an angle of 57 degrees (Brewster's angle $\theta_B$), Curve A2 shows a reflectivity spectrum, of a head-up display system comprising a transparent nanofilm comprising two silver layers, for p-polarized light incident at an angle of 57 degrees (Brewster's angle $\theta_B$), and Curve A3 shows a reflectivity spectrum, of a head-up display system comprising a transparent nanofilm comprising three silver layers, for p-polarized light incident at an angle of 57 degrees (Brewster's angle $\theta_B$).

Curve A0 is extremely close to 0, indicating that the glass without film is extremely weak in reflecting the incident p-polarized light. Curve A1 showing that a spectral curve of the reflectivity, of the head-up display system comprising the transparent nanofilm comprising one silver layer, for the p-polarized light is relatively flat over the visible light wavelength range (400-700 nm) which can be sensed by human eyes, and the reflectivity is higher than 10%. Therefore, according to Curve A1 and the sensibility of human eyes for the p-polarized light wavelength and comfortability, preferably, when the transparent nanofilm 3 comprises one metallic layer (such as silver layer), the color of the p-polarized light 11 generated by the projection light source 1 may be at least one selected from a group consisting of red, green and blue, for example, a combination of red, green and blue which may achieve full-color display.

Curve A2 shows that the reflectivity spectrum, of the head-up display system comprising the transparent nanofilm comprising two silver layers, for the p-polarized light is mainly in the blue light range (450-500 nm) and green light range (500-550 nm), and thus a monochrome (blue or green) display or dichromatic (blue and green) display may be achieved by selecting a suitable p-polarized light wavelength. Meanwhile, in contrast with Curve A1, the reflectivity for the p-polarized light in Curve A2 is relatively small in the blue and green ranges, and by means of increasing the luminance of the projection light source 1, the displayed images may be clearly visible in the sunlight. Therefore, according to Curve A2 and the sensibility of human eyes for the p-polarized light wavelength and comfortability, preferably, when the transparent nanofilm 3 comprises two metallic layers (such as silver layers), the color of the p-polarized light 11 generated by the projection light source 1 may be at least one selected from a group consisting of green and blue. For example, when the projection light source 1 is a broadband light source (such as TFT-LCD screen with a LED backlight), the dichromatic display of blue and green may be achieved.

Curve A3 showing that a spectral curve of the reflectivity, of the head-up display system comprising the transparent nanofilm comprising three silver layers, for the p-polarized light is not flat, however, the head-up display may also be achieved by selecting a suitable wavelength range in the visible light wavelength range (400-700 nm) which can be sensed by human eyes, such as the blue light wavelength 450-500 nm, the green light wavelength 500-550 nm and the red light wavelength 630-680 nm. Likewise, in contrast with Curve A1, the reflectivity for the p-polarized light in Curve A3 is relatively low, and by means of increasing the luminance of the projection light source 1, the displayed images may be clearly visible in the sunlight. Therefore, according to Curve A3 and the sensibility of human eyes for the p-polarized light wavelength and comfortability, preferably, when the transparent nanofilm 3 comprises three metallic layers (such as silver layers), the color of the p-polarized light 11 generated by the projection light source 1 may be at least one selected from a group of consisting of red, green and blue, for example, a combination of red, green and blue which may achieve full-color display.

Figure 5:
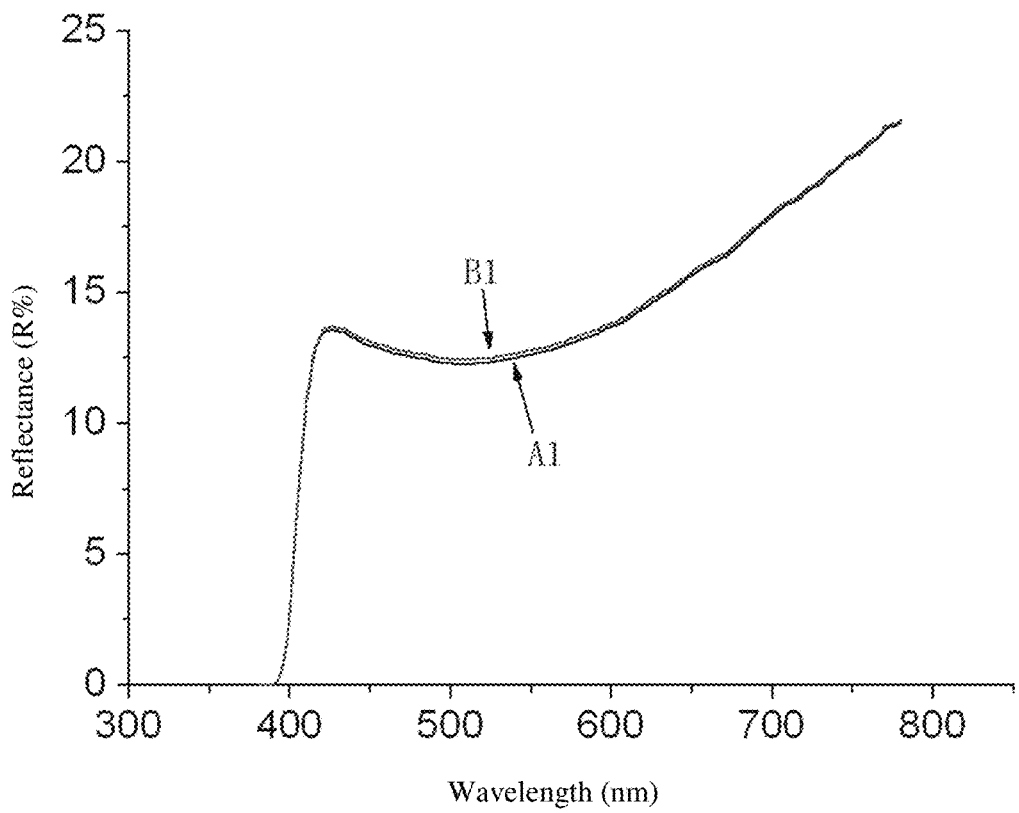
FIG. 5 is a graph showing a reflectivity spectrum of a head-up display system in simulated rainy environment for p-polarized light, according to the present disclosure.

In rainy or hazy weather, the internal and external surfaces of the front windshield of the automobile are readily covered by a water layer. Since the refractive index of water and glass is different, the p-polarized light may be reflected on the interface of the water layer contacting the glass. As shown in FIG. 5, taking the head-up display system comprising the transparent nanofilm comprising one silver layer as an example, Curve B1 in FIG. 5 shows a spectral curve of the reflectivity of the head-up display system comprising the transparent nanofilm comprising one silver layer, the external glass panel of which is covered by a water layer. By comparing Curve B1 with Curve A1, it may be known that the reflectivity for the p-polarized light as shown in Curve B1 is slightly increased, which indicates that the reflection intensity of the water layer for the p-polarized light is relatively low, without affecting the reflection intensity of the metallic layer for the p-polarized light, such that visual interference and double images are not caused.

Figure 6:
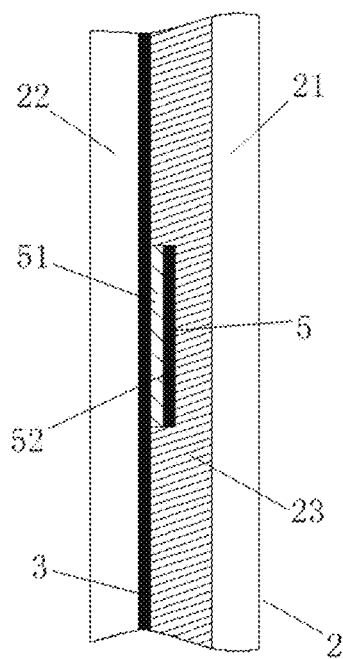
FIG. 6 is a partial sectional view of a head-up display system provided with an auxiliary film according to the present disclosure.
Figure 7:
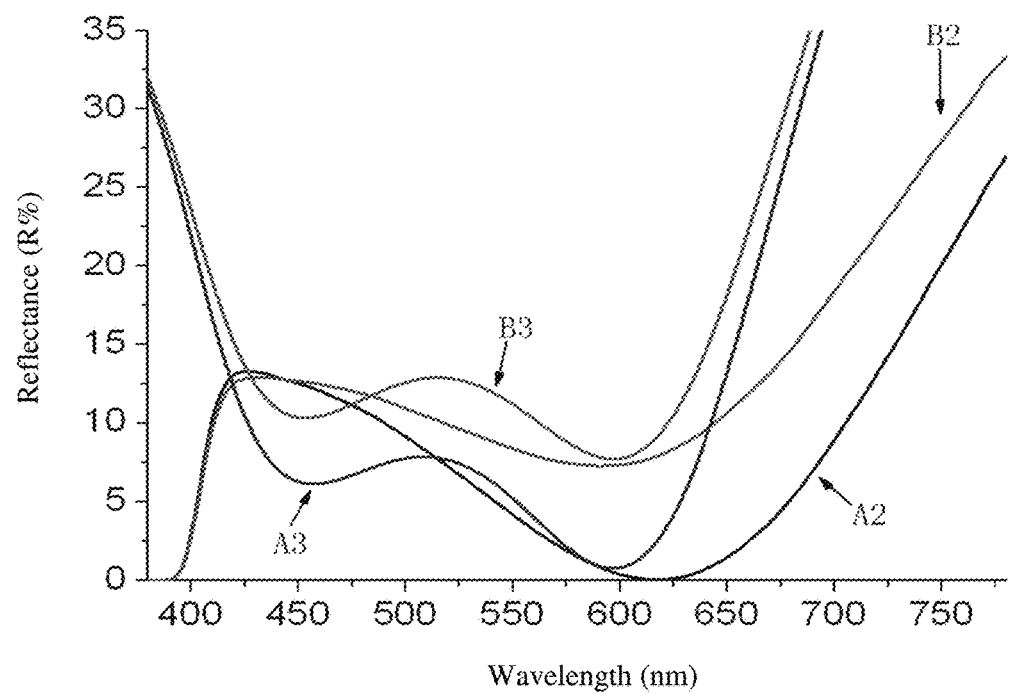
FIG. 7 is a graph showing a reflectivity spectrum of a head-up display system provided with an auxiliary film for p-polarized light, according to the present disclosure.

As for the disadvantage that, as shown in FIG. 4, the head-up display system comprising the transparent nanofilm comprising two silver layers has a relatively low reflectivity for the p-polarized light and is incapable of achieving full-color display, and the head-up display system comprising the transparent nanofilm comprising three silver layers has a relatively low reflectivity for the p-polarized light, preferably, as shown in FIG. 6, an auxiliary film 5 is additionally disposed in the present disclosure when the transparent nanofilm 3 in the head-up display system comprises two metallic layers (such as two silver layers) or three metallic layers (such as three silver layers). The auxiliary film 5 comprises at least one auxiliary polymer film 51 and an auxiliary transparent nanofilm 52 disposed on the auxiliary polymer film 51 and comprising a metallic layer. Preferably, the difference between the refractive index of the auxiliary polymer film 51 and the refractive index of the internal glass panel 21 and external glass panel 22 is no more than 0.1, e.g. a PET film. As shown in FIG. 6, the auxiliary film 5 comprises an auxiliary polymer film 51 which is adjacent to the transparent nanofilm 3, and the auxiliary transparent nanofilm 52 is adjacent to the intermediate film 23. It is understood that a protective transparent polymer layer may be additionally disposed between the auxiliary transparent nanofilm 52 and the intermediate film 23, or the auxiliary polymer film 51 is adjacent to the intermediate film 23 and meanwhile an adhesive polymer layer is disposed between the auxiliary transparent nanofilm 52 and the transparent nanofilm 3. The difference between the refractive index of the protective layer and the adhesive polymer layer and the refractive index of the internal glass panel 21 and the external glass panel 22 is no more than 0.1. The auxiliary film 5 is located at an area where the p-polarized light 11 is incident, i.e. the projection display area of the head-up display system. The distance between the auxiliary transparent nanofilm 52 in the auxiliary film 5 and the transparent nanofilm 3 comprising two metallic layers or three metallic layers is no more than 350 μm, and the structure of the auxiliary transparent nanofilm 52 and the structure of the transparent nanofilm 3 comprising one metallic layer (such as one silver layer) may be the same, or may be different. Although the additionally disposed auxiliary film 5 can also reflect the p-polarized light, clearly visible double images may not be caused, since the distance between the auxiliary transparent nanofilm 52 and the transparent nanofilm 3 comprising two metallic layers or three metallic layers is quite small, and therefore reflected images generated by the two films can be greatly overlapped. In order to achieve a better display effect, preferably, the distance between the auxiliary transparent nanofilm 52 in the auxiliary film 5 and the transparent nanofilm 3 comprising two metallic layers or three metallic layers is no more than 100 μm, more preferably, the distance is no more than 50 μm. Meanwhile, as shown in FIG. 7, Curve B3 shows a spectral curve of the reflectivity, of the head-up display system provided with the auxiliary film 5 and comprising the transparent nanofilm comprising two silver layers, for the p-polarized light, Curve B4 shows a spectral curve of the reflectivity, of the head-up display system provided with the auxiliary film 5 and comprising the transparent nanofilm comprising three silver layers, for the p-polarized light, it may be known from comparison that in contrast with Curve A3 or Curve A4 without additionally disposing the auxiliary film 5, the reflectivity shown by Curve B3 or Curve B4 is apparently higher, which indicates that the head-up display system provided with the auxiliary film 5 has a higher reflectivity for the p-polarized light, and the full-color high-definition projection display may be achieved.

To more detailedly and more persuasively explain the concept of the present disclosure, some examples are provided below for detailed description.

Examples 1-3 and Comparative Example 1

A sheet of soda-lime-silica float glass having a thickness of 2.1 mm manufactured by FUYAO GLASS INDUSTRY GROUP CO., LTD. is adopted as a substrate, and after processes of cutting, edging, washing and drying, etc., the substrate is delivered to a magnetron sputtering line for film deposition. Dielectric layers and silver layers is deposited on the substrate according to the following settings:

Example 1 glass substrate/$Si_3N_4$ 30 nm/$TiO_2$ 5 nm/ZnO 8 nm/Ag 11.9 nm/$NiCrO_x$ 3 nm/$ZnSnMgO_x$ 38 nm/$Si_3N_4$ 5 nm;

Example 2 glass substrate/$Si_3N_4$ 23 nm/ZnO 7 nm/Ag 10 nm/$NiCrO_x$ 2 nm/ZnO 7 nm/$Si_3N_4$ 63 nm/ZnO 7 nm/Ag 10 nm/$NiCrO_x$ 2 nm/ZnO 8 nm/$ZnSnMgO_x$ 31 nm/$Si_3N_4$ 4 nm;

Example 3 glass substrate/$Si_3N_4$ 22 nm/ZnO 7 nm/Ag 10 nm/Zr 1 nm/ZnO 7 nm/$Si_3N_4$ 58 nm/ZnO 7 nm/Ag 10 nm/Zr 1 nm/ZnO 7 nm/$Si_3N_4$ 62 nm/ZnO 7 nm/Ag 10 nm/Zr 1 nm/ZnO 9 nm/$ZnSnMgO_x$ 30 nm/$Si_3N_4$ 4 nm.

After finishing the film deposition, the glass is molded in an automobile glass high-temperature molding process together with another sheet of soda-lime-silica float glass as a matching substrate having a thickness of 2.1 mm manufactured by FUYAO GLASS INDUSTRY GROUP CO., LTD. A colorless PVB film having a thickness of 0.76 mm is sandwiched between them, and then high-pressure lamination is performed in an autoclave. After other processes such as accessory installation, laminated glass comprising a transparent nanofilm may be manufactured.

In the comparative example 1, an ordinary flat laminated glass without film is adopted, and has a structure consisting of two sheets of float glass each having a thickness of 2.1 mm and a colorless PVB film sandwiched therebetween and having a thickness of 0.76 mm. All the processes except the film deposition are the same as aforementioned.

The projection light source in each of the head-up display systems in the examples 1-3 and the comparative example 1 may be a TFT-LCD projector with a LED backlight which can generate p-polarized light, and comprises a plurality of reflectors. The location of the projector and the incident direction of the emitting light are adjusted such that the displayed images visible to an observer is clearest. When imaging on the glass in the comparative example 1, a resin half-wave plate may be added between the projector and the glass such that the polarization direction may be changed into s-polarization direction to improve the imaging luminance, while in the examples 1-3, the incident light is still the p-polarized light. The polarized light generated by the projection light source in each of the head-up display systems in the examples 1-3 and the comparative example 1 is incident at the Brewster's angle $\theta_B$ of 57 degrees, while other setting parameters and display quality are all as shown in table 1.

TABLE 1 the head-up display systems and the display quality thereof in the examples 1-3

|  |  | comparative example 1 | example 1 | example 2 | example 3 |
|---|---|---|---|---|---|
| transparent nanofilm | type | without film | transparent nanofilm comprising one silver layer | transparent nanofilm comprising two silver layers | transparent nanofilm comprising three silver layers |
|  | location |  | the third surface | the fourth surface | the fourth surface |
| polarization direction |  | S | P | P | P |
| color of polarized light |  | white | white | two colors of blue and green | green |
| display quality |  | serious double images | clear without a ghost image | clear without a ghost image | clear without a ghost image |

It may be known from the table 1 that the head-up display systems in the examples 1-3 can prevent double images, and can clearly display the images. Furthermore, the incident angle of the p-polarized light may be deviated from 57 degrees (Brewster's angle $\theta_B$), for example, the incident angle of the p-polarized light in the example 1 may be increased to approximately 68 degrees, while the images are still clear without a visible ghost image; the incident angle of the p-polarized light in the example 2 and the example 3 may be set to be 62 degrees, while the images are still clear without a visible ghost image.

Examples 4-6

A sheet of soda-lime-silica float glass having a thickness of 2.1 mm manufactured by FUYAO GLASS INDUSTRY GROUP CO., LTD. is adopted as a substrate, and after the processes of cutting, edging, washing and drying, etc., the glass is molded in the automobile glass high-temperature molding process together with another sheet of soda-lime-silica float glass as a matching substrate having a thickness of 2.1 mm manufactured by FUYAO GLASS INDUSTRY GROUP CO., LTD. Before lamination, a high-transparent polyester (PET) film comprising a transparent nanofilm including one silver layer is disposed on at least part of the surface of the molded front windshield. In the example 4, as shown in FIG. 3A or FIG. 3B, the high-transparent polyester (PET) film comprising a transparent nanofilm comprising one silver layer is disposed between the internal glass panel 21 and the intermediate film 23 or between the external glass panel 22 and the intermediate film 23. In the example 5, as shown in FIG. 3C, the high-transparent polyester (PET) film comprising a transparent nanofilm comprising one silver layer is disposed on the surface 211, i.e. the first surface 211, of the internal glass panel 21 distal to the intermediate film 23. In the example 6, as shown in FIG. 3D, the high-transparent polyester (PET) film comprising a transparent nanofilm comprising one silver layer is disposed between two PVB films 23. Then, laminated glass is manufactured from the aforementioned glass having the high-transparent polyester (PET) film after consequent processes such as lamination, accessory installation, etc.

The p-polarized light source in each of the examples 4-6 may be a TFT-LCD projection light source with a LED backlight which can generate p-polarized light. The p-polarized light generated by the projection light source in each of the head-up display systems in the examples 4-6 is incident at the Brewster's angle $\theta_B$ of 57 degrees, while the types and locations of the transparent nanofilms, the colors of the p-polarized light and the resulting display quality are all as shown in table 2.

TABLE 2 the head-up display systems and the display quality thereof in the examples 4-6

|  |  | example 4 | example 5 | example 6 |
|---|---|---|---|---|
| transparent nanofilm | type | high-transparent polyester (PET) film | high-transparent polyester (PET) film | high-transparent polyester (PET) film |
|  | location | the third or fourth surface | the first surface | between two PVB films |
| color of p-polarized light |  | white | white | white |
| display quality |  | clear without a ghost image | clear without a ghost image | clear without a ghost image |

It may be known from the table 2 that the head-up display systems in the examples 4-6 can prevent double images, and can clearly display the images.

Examples 7-8

The example 7 and the example 8 are similar to the example 2 and the example 3, respectively, while the difference is that as shown in FIG. 6, the auxiliary film 5 is additionally disposed in the incident area of the p-polarized light, i.e. the projection display area of the head-up system, the auxiliary film 5 consisting of a PET film having a thickness of 50 μm and an auxiliary transparent nanofilm 52 deposited on the PET film.

The structure of the auxiliary transparent nanofilm 52 of the auxiliary film 5 in the example 7 is: PET film/ZnSnO$_x$ 27 nm/ZnO 7 nm/Ag 10 nm/Ti 1 nm/ZnO 8 nm/ZnSnO$_x$ 21 nm.

The structure of the auxiliary transparent nanofilm 52 of the auxiliary film 5 in example 8 is: PET film/ZnSnO$_x$ 26 nm/ZnO 10 nm/Ag 10 nm/Ti 1 nm/ZnO 9 nm/ZnSnO$_x$ 39 nm.

The p-polarized light generated by the projection light source in each of the head-up display systems in the examples 7-8 is incident at the Brewster's angle $\theta_B$ of 57 degrees, and the p-polarized light is of full-color display. Meanwhile, the relevant technical parameters of the nature light incident at normal incidence and at an angle of 60° are listed respectively, as shown in the table 3. Moreover, FIG. 7 shows the reflectivity spectrum, of each of the head-up display systems in the examples 7-8, for the p-polarized light.

TABLE 3 the head-up display systems and technical parameters thereof in the examples 7-8

|  |  |  |  | example 7 | | example 8 | |
|---|---|---|---|---|---|---|---|
| types of transparent nanofilm |  |  |  | transparent nanofilm comprising two silver layers | | transparent nanofilm comprising three silver layers | |
| whether additionally disposing an auxiliary film or not |  |  |  | no | yes | no | yes |
| nature light | incident at normal incidence | transmissivity for visible light (TL %) |  | 75.96 | 72.85 | 72.15 | 68.68 |
|  |  | reflectivity for visible light (RL %) |  | 14.96 | 15.06 | 11.94 | 15.67 |
|  |  | reflected color on glass surface | L* | 45.93 | 45.83 | 41.34 | 46.69 |
|  |  |  | a* | −7.63 | −3.46 | −5.11 | −3.49 |
|  |  |  | b* | −8.64 | −2.07 | −8.45 | −6.08 |
|  | incident at an angle of 60° degrees | transmissivity for visible light (TL %) |  | 71.06 | 66.54 | 66.77 | 60.18 |
|  |  | reflectivity for visible light (RL %) |  | 18.37 | 19.97 | 16.22 | 20.07 |
|  |  | reflected color on glass surface | L* | 50.31 | 51.92 | 47.46 | 52.05 |
|  |  |  | a* | −3.96 | −0.45 | 2.15 | 2.07 |
|  |  |  | b* | −8.79 | −2.46 | −4.11 | −2.45 |
| p-polarized light | incident at an angle of 57° degrees | reflectivity for visible light (RL %) |  | 4.75 | 8.75 | 4.55 | 10.86 |
|  |  | reflected color on glass surface | L* | 27.38 | 35.92 | 25.82 | 39.45 |
|  |  |  | a* | −10.36 | −0.14 | −6.39 | −2.90 |
|  |  |  | b* | −26.58 | −9.89 | −8.51 | −1.94 |

It may be known from the table 3 and FIG. 7 that the head-up display systems in the examples 7-8 can prevent double images, and can clearly display full color images. Moreover, by optimizing the structure and thickness of the transparent nanofilm comprising one silver layer in the auxiliary film, the color in the area where the auxiliary film is additionally disposed is substantially identical to the color in the area where the auxiliary film is not additionally disposed. Furthermore, in contrast with the area where the auxiliary film is not additionally disposed, the area where the auxiliary film is additionally disposed, while having a slightly decreased transmissivity for visible light (TL %), has a doubled reflectivity for the p-polarized light (RL %), such that the projection image is more clear.

The embodiments of the present disclosure listed above describe the structure of the head-up display systems, while the deposition process and parameters of the film, specific manufacturing processes and parameters of the laminated glass are not described therein. It may be understood that those not described herein are familiar to persons skilled in the art, and therefore, does not affect the protection scope of the present disclosure.

A detailed description is hereinbefore provided for the head-up display system according to the present disclosure, and several embodiments are listed for explanation. However, the present disclosure is not limited by the aforementioned embodiments and corresponding examples. Therefore, any improvements, equivalent modifications and substitutions, etc. within the spirit and principle of the present disclosure fall within the protection scope of the present disclosure.

What is claimed is:

1. A head-up display system, comprising a projection light source and laminated glass, the laminated glass comprising an internal glass panel, an external glass panel and an intermediate film sandwiched between the internal glass panel and the external glass panel, wherein the head-up display system further comprises a transparent nanofilm comprising at least two dielectric layers and at least one metallic layer, each metallic layer being located between two dielectric layers; a difference between a refractive index of the intermediate film and a refractive index of the internal glass panel and the external glass panel is no more than 0.1; the projection light source is used for generating p-polarized light which is incident on a surface of the internal glass panel distal to the intermediate film, the light having an angle of incidence of 42 to 72 degrees; the transparent nanofilm is located between the internal glass panel and the external glass panel or is disposed on a side of the internal glass panel distal to the intermediate film; the metallic layer of the transparent nanofilm is used for reflecting part of the incident p-polarized light; when the transparent nanofilm comprises one or three metallic layers, the color of the p-polarized light generated by the projection light source is at least one color selected from a group consisting of red, green and blue; and when the transparent nanofilm comprises two metallic layers, the color of the p-polarized light generated by the projection light source is at least one color selected from a group consisting of green and blue.

2. The head-up display system according to claim 1, wherein the metallic layer is a silver layer or a silver-containing alloy layer.

3. The head-up display system according to claim 1, wherein the p-polarized light has an angle of incidence of 55 to 70 degrees.

4. The head-up display system according to claim 1, wherein the difference between the refractive index of the intermediate film and the refractive index of the internal glass panel and the external glass panel is no more than 0.05.

5. The head-up display system according to claim 1, wherein the transparent nanofilm is disposed on a surface of the internal glass panel contacting the intermediate film or on a surface of the external glass panel contacting the intermediate film.

6. The head-up display system according to claim 1, wherein the transparent nanofilm is disposed on a polymer film, a difference between a refractive index of the polymer film and the refractive index of the internal glass panel and the external glass panel being no more than 0.1; and the polymer film provided with the transparent nanofilm is located between the internal glass panel and the external glass panel or is disposed on the surface of the internal glass panel distal to the intermediate film.

7. The head-up display system according to claim 1, wherein, when the transparent nanofilm in the head-up display system comprises two metallic layers or three metallic layers, an auxiliary film is additionally disposed, and comprises at least one auxiliary polymer film and an auxiliary transparent nanofilm disposed on the auxiliary polymer film and comprising a metallic layer; the auxiliary film is located at an area where the p-polarized light is incident, a distance between the auxiliary transparent nanofilm in the auxiliary film and the transparent nanofilm comprising two metallic layers or three metallic layers is no more than 350 μm.

8. The head-up display system according to claim 7, wherein the distance between the auxiliary transparent nanofilm in the auxiliary film and the transparent nanofilm comprising two metallic layers or three metallic layers is no more than 100 μm.

* * * * *